July 20, 1937.  C. A. CAMPBELL  2,087,418
PRESSURE GAUGE
Filed Dec. 27, 1933
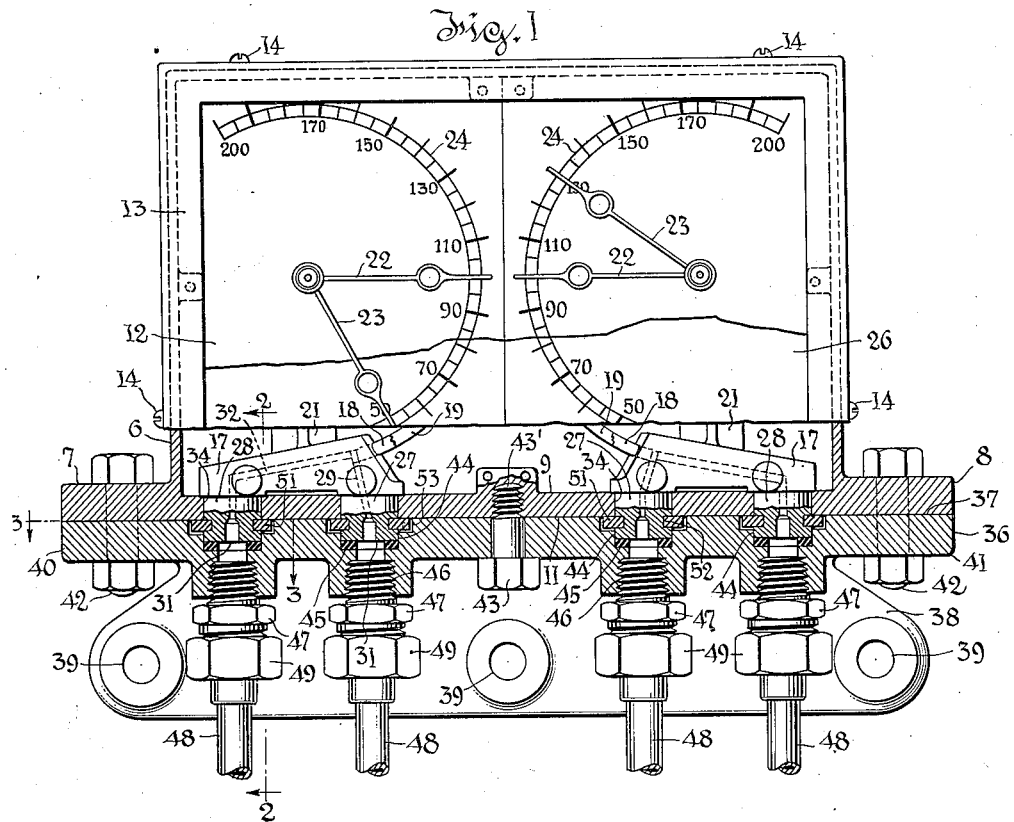
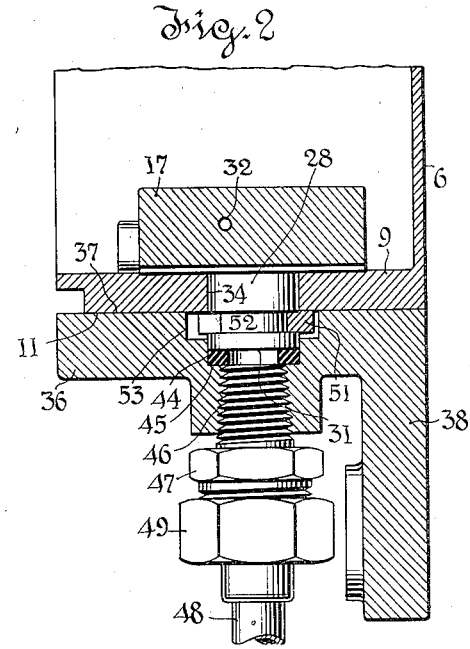
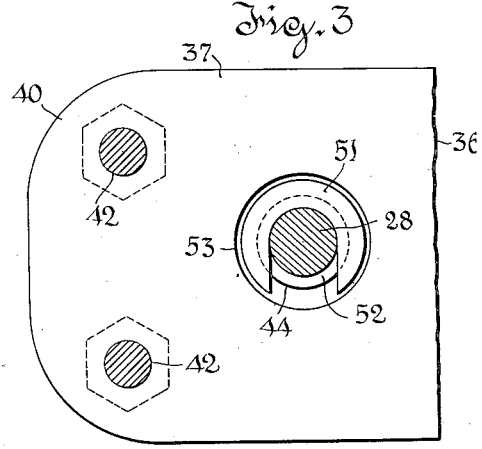
Inventor
Charles A. Campbell
By
Dodge and Son
Attorneys Patented July 20, 1937

2,087,418

UNITED STATES PATENT OFFICE 2,087,418

PRESSURE GAUGE

Charles A. Campbell, Watertown, N. Y., assignor to The New York Air Brake Company, a corporation of New Jersey Application December 27, 1933, Serial No. 704,188

7 Claims. (Cl. 73—109)

This invention relates to pressure gauges, and more particularly to the manner in which the pressure indicating mechanism is secured in place in the gauge case.

Bourdon tube type pressure gauges, to which the present invention is particularly directed, generally comprise a gauge case, a pressure indicating device, including a Bourdon tube or spring, mounted in the case, and a nipple projecting through an opening in the case, whereby the indicating mechanism may be connected to a pressure fluid conductor. Releasable fastening means, usually in the form of machine screws, extend inwardly through the wall of the gauge case into threaded engagement with the indicating device, whereby to secure it rigidly in place in the case. There are two to four of these screws, and sometimes more, thereby necessitating a number of time-consuming operations whenever it is desired to remove the indicating device or to mount it in place in the case. Such removals are frequently necessary for the purpose of inspection or replacement.

In the case of multiple type gauges, i. e., those in which a number of independently operating pressure indicating devices are mounted in the same gauge case, a corresponding number of nipples project from the case for connection of the pressure indicating devices to a similar number of pressure fluid conductors. Each indicating device requires the usual number of screws to secure it in place. Thus, in the multiple type gauge the number of operations and the time consumed incident to a removal or replacement job on the pressure indicating mechanism is considerable.

It is one of the principal purposes of the present invention to increase the facility with which removal and replacement of the pressure indicating means may be accomplished by reducing to a minimum the number of connections between the indicating means and the gauge case, and, at the same time, provide for rigid mounting of the indicating means therein. A further object is the provision of connecting means for the purpose mentioned which are designed for ready release, thereby further facilitating removal and replacement operations.

More specifically, the present invention is directed to improvement of the manner of securing the pressure indicating mechanism to the case in a gauge construction of the type disclosed in the copending application of William E. Vergan, Serial No. 706,260, filed January 11, 1934. In such construction, the pressure indicating mechanism is secured to the case by a plurality of machine screws. Non-threaded nipples project through openings in the case into sealing contact with sockets provided in the upper supporting face of a bracket member to which the case is detachably connected. Pipes are attached to the bracket and communicate therethrough with the corresponding nipples and pressure indicating devices. It is proposed by the present invention to eliminate entirely the machine screws referred to and to connect the indicating mechanism rigidly to the case solely by readily removable means applied directly to the projecting portions of the nipples.

In the drawing which discloses a practical embodiment of the invention:—

Fig. 1 is a front elevation of a multiple type gauge of the general construction shown in the Vergan application referred to with my improvements applied thereto, certain of the parts being partially broken away to disclose a portion of the pressure indicating mechanism and the means for fastening said mechanism in place in the gauge case;

Fig. 2 is a section on line 2—2 of Fig. 1 showing said fastening means in more detail; and Fig. 3 is a section on line 3—3 of Fig. 1 showing further details of the fastening means and the associated parts.

The pressure gauge illustrated in the drawing is of the quadruplex type. This type includes four independent pressure indicating mechanisms mounted in a single case and having nipples extending therefrom for connection to separate pressure fluid conductors. It will be understood that the present invention is not intended to be limited to this type of gauge, since certain of the features thereof are applicable to gauges in which only a single pressure indicating device is employed.

The gauge case 6 is provided with integral attaching ears 7, 8 at opposite sides thereof. These ears form extensions of the bottom wall 9 of the case, and the under side of the case and the ears are finished to provide a plane, smooth surface 11 for a purpose mentioned later. The front, open side of case 6 is covered by a glass 12 and a frame 13, screws 14 securing the frame to the case.

Mounted rigidly side by side in case 6 is a pair of pressure indicating units which are adapted for removal and replacement entirely independently of each other, as explained below. These units are identical in construction, except for their reverse arrangement; hence, only one will be described in detail.

Each unit comprises two pressure indicating devices adapted for connection to separate pressure fluid conductors. The base of each unit is in the form of a frame member 17 in which is mounted a pair of Bourdon tubes 18, 19, while a supporting standard 21 projects upwardly therefrom. Bourdon tube 18 actuates an indicating hand 22 through the usual connections (not shown), while tube 19 actuates an indicating hand 23. These hands cooperate with scale 24 on a dial 26 to register the respective pressures.

Depending from frame member 17 is a pair of smooth-surfaced, cylindrical nipples or bosses 27, 28. Bourdon tube 18 communicates with the outer ported end 31 of nipple 27 by way of a passage 29 extending through frame member 17 and the nipple. Passage 32 provides communication between tube 19 and the lower ported end of nipple 28. Each of the nipples 27, 28 projects snugly through a corresponding opening 34 formed in the lower wall 9 of the gauge case. In this manner, provision is made for rigidly supporting each of the gauge units in the case.

Gauge case 6 is carried by a bracket or connecting member 36 formed with an upper finished face 37 which closely engages under surface 11 of the gauge case or frame 6. Bracket 36 has a depending flange 38 provided with openings 39 whereby it may be bolted or otherwise secured to a suitable support. Bracket 36 is also formed with attaching ears 40, 41 corresponding to ears 7, 8 on case 6. Bolting devices 42 located in registering openings in these ears rigidly secure the case and the bracket together. There is also a machine screw 43 projecting through an opening in the middle of the bracket and having threaded engagement at 43' with case 6.

Bracket 36 is provided on its upper face with a series of sockets 44 into which the projecting ends of the several indicator nipples 27, 28 extend. A gasket 45 in each of the sockets provides for sealing contact between the nipple end and the bracket, while a threaded passage 46 leads from the bottom of each socket 44 to the under side of bracket 36. A pipe nipple 47 is threaded into the lower end of this passage. To the nipple 47 a pressure fluid conductor 48 is attached by a conventional pipe union 49.

Except for the omission of the means for fastening the pressure indicator units to the case, the gauge construction so far described is that covered by the copending application of William E. Vergan hereinbefore mentioned; hence, no claim is made here to this construction.

As stated, the present improvements are directed to the manner in which the pressure indicating unit is secured in the gauge case 6. In the gauge construction of the Vergan case, supra, and in other similar gauges known to me, this was accomplished by a plurality of machine screws extending upwardly through the bottom wall 9 of the case and into threaded engagement with suitable openings provided in frame member 17 of the indicator unit. In my improved construction, illustrated in the accompanying drawing, all of these machine screws are eliminated and the pressure indicating unit is rigidly secured in place in the gauge case 6 by readily detachable and replaceable fastening means engaging the projecting end of each of the indicator nipples 27, 28.

The fastening means referred to are in the form of a U-shaped member or washer 51 straddling the nipple outside of case 6 and having portions of its base and legs located in an annular groove 52 formed in the nipple adjacent the lower face 11 of the case. It is important to note that the location of groove 52 on the indicator nipple and the size and shape of fastening member 51 are such that, when the parts are in place, U-shaped member 51 is in tight frictional engagement with the groove and with the under face 11 of the case. This insures that the pressure indicator unit is held rigidly in place. The form of the fastening member 51 and its position when in place appears particularly clear from Fig. 3. Here it will be seen that, in order to accommodate member 51, the socket 44 in the upper face of bracket 36 is counterbored or enlarged at 53.

When the gauge is in the completely assembled condition of Fig. 1, bolting devices 42 and machine screw 43 serve to clamp gauge case 6 rigidly to bracket 36 with the surfaces 11 and 37 of the case and bracket, respectively, in close contact with each other. Because of the presence of fastening members 51, tightening of the bolting devices 42 has served to force the lower flat ends of the several indicator nipples 27, 28 into close engagement with the gaskets 45. This insures fluid tight communication between pipes 48 and the respective indicating mechanisms with which they are connected.

With the described arrangement, when it is desired to remove the gauge for inspection or replacement purposes, it is not necessary to break any of the pipe connections 49, but the gauge is simply removed from bracket 36 following disconnection of the bolting devices 42 and screw 43. After detachment of cover frame 13 and glass 12, the U-shaped fastening members 51 may be quickly forced sidewise out of grooves 52 and either or both of the pressure indicating units taken from the case. In replacing the parts, the operations just described are performed in the reverse order, the indicator units being mounted in the case first and fastening members 51 forced sidewise into their grooves in the indicator nipples, as shown in Fig. 3.

Employment of the U-shaped fastening members 51 considerably increases the facility with which the multiple indicating mechanism or a unit thereof may be removed from or replaced in the gauge case, not only by reducing to a minimum the number of connections between the case and the indicating mechanism, but also by providing connections of a quickly releasable nature. Notwithstanding the reduced number of connections between these parts and the fact that they may be quickly released or assembled when desired, the fastening means provided afford adequate provision for firmly securing the indicating means in place.

What is claimed is:—

1. In a pressure gauge, a gauge case; pressure indicating means mounted in said gauge case and including a pressure fluid conducting nipple projecting outside of the case through an opening therein, said nipple being provided with an annular groove externally of the case; and a removable U-shaped member located in said groove and engaging the case to prevent movement of the nipple in said opening and thereby secure the indicating means rigidly in place.

2. In a pressure gauge, a gauge case; pressure indicating means in said case, said indicating means including a ported nipple located in an opening in the case; quickly detachable means on the outside of the case engaging the case and a portion of said nipple to prevent inward longitudinal movement of the nipple in said opening and thereby rigidly secure the indicating means in place, said securing means comprising a removable member adapted for movement in a direction transversely of and towards the nipple in rigidly securing the nipple in the opening and in a direction transversely of and away from the nipple in releasing the nipple to permit movement thereof in the opening; and guide means on the nipple for causing the removable member to move in said directions relatively to the nipple when said member is moved to rigidly secure the nipple in place or to release it.

3. In a pressure gauge, a gauge case having a wall; pressure indicating means located in the gauge case in contact with said wall and including a fluid conducting nipple projecting outside of the case through an opening in said wall, the nipple being provided with an annular groove located externally of the case; a removable U-shaped member located in said groove and engaging the case to prevent movement of the nipple in said opening and thereby secure the indicating means rigidly in place; a connecting member to which the gauge case is removably attached, said connecting member being provided with a socket in which the outer end of the nipple is located, the socket being countersunk to receive the U-shaped member; a gasket located in the bottom of said socket in sealing engagement with the outer end of the nipple; and a fluid conductor attached to the connecting member and communicating therethrough with the nipple.

4. In a pressure gauge, a gauge case; pressure indicating means mounted in said gauge case and including a pressure fluid conducting nipple projecting outside of the case through an opening therein, said nipple being provided with a peripheral, transversely disposed groove located externally of the case; and a removable U-shaped member engaging the case and having its legs located in said groove to prevent longitudinal movement of the nipple in said opening and thereby rigidly secure the indicating means in place.

5. In a pressure gauge, a gauge case; pressure indicating means mounted in said gauge case and including a pressure fluid conducting nipple projecting outside of the case through an opening therein, said nipple being provided on its periphery with a transversely disposed groove located externally of the case; and a laterally removable, U-shaped member engaging the case and having a leg thereof located in said groove to prevent longitudinal movement of the nipple in said opening and thereby rigidly secure the indicating means in place.

6. In a pressure gauge, a gauge case; pressure indicating means mounted in said gauge case and including a pressure fluid conducting nipple projecting outside of the case through an opening therein, said nipple being provided with a transversely disposed shoulder located externally of the case; and a laterally removable, U-shaped member interposed between said shoulder and the case to prevent inward longitudinal movement of the nipple in said opening and thereby rigidly secure the indicating means in place.

7. In a pressure gauge, a gauge case; pressure indicating means mounted in said gauge case and including a pressure fluid conducting nipple projecting outside of the case through an opening therein; and laterally removable, holding means having a pair of legs interposed between the case and a portion of said nipple located externally of the case to prevent inward longitudinal movement of the nipple in said opening and thereby rigidly secure the indicating means in place.

CHARLES A. CAMPBELL.